(12) United States Patent
Stenberg

(10) Patent No.: US 6,934,514 B2
(45) Date of Patent: Aug. 23, 2005

(54) SYSTEM FOR TRANSMITTING DIGITAL SIGNALS WITH FM SIGNALS

(75) Inventor: James T. Stenberg, Portland, ME (US)

(73) Assignee: SPX Corporation, Charlotte, NC (US)

( * ) Notice: Subject to any disclaimer, the term of this patent is extended or adjusted under 35 U.S.C. 154(b) by 811 days.

(21) Appl. No.: 09/878,167

(22) Filed: Jun. 12, 2001

(65) Prior Publication Data

US 2002/0187759 A1 Dec. 12, 2002

(51) Int. Cl.[7] ................................................ H04B 1/00
(52) U.S. Cl. ......................... 455/45; 455/103; 455/104; 455/105
(58) Field of Search ........................... 455/45, 103, 104, 455/105; 375/295, 299

(56) References Cited

U.S. PATENT DOCUMENTS 5,555,016 A * 9/1996 Rhodes et al. ................. 725/73
6,549,242 B1 * 4/2003 Plonka ........................ 348/487

* cited by examiner

Primary Examiner—Ahmad F. Matar
Assistant Examiner—Quynh H. Nguyen
(74) Attorney, Agent, or Firm—Baker & Hostetler LLP; Jonathan A. Kidney

(57) ABSTRACT

A system for transmitting digital signals in the same band and on the same channel with FM signals is disclosed. The design of the system according to the present invention includes a coupler, which may be a +3 dB hybrid quadrature coupler, and circularly polarized antenna. The +3 dB hybrid quadrature coupler maintains isolation between the FM signals and the digital signals. The circularly polarized antenna receives the FM signals and the digital signals, and transmits the signals after they have each been separately received at the circularly polarized antenna.

17 Claims, 3 Drawing Sheets

SYSTEM FOR TRANSMITTING DIGITAL SIGNALS WITH FM SIGNALS

FIELD OF THE INVENTION

The present invention relates generally to radio broadcasting. More particularly, the present invention relates to providing a system for transmitting digital signals in the same band and on the same channel with frequency-modulated (FM) signals.

BACKGROUND OF THE INVENTION

Broadcast frequency spectrum is a resource in which the demand, compared to the spectrum availability, is high because there are many other forms of broadcast communication, such as television, radio, and wireless communication services, that also require bandwidth for transmitting data. The use of the spectrum is therefore highly regulated by the Federal Communications Commission ("FCC").

Digital communication is becoming a more common method for broadcast communication. In general, digital communication allows for the delivery of communication services that are of a better quality than counterpart analog methods of communication and can be made to be faster and more efficient than analog communication.

Digital Audio Broadcasting (DAB) is among the various services that require bandwidth. DAB is a digital method of transmitting audio signals and data services to radio receivers. DAB is superior to existing methods for transmitting analog AM and FM audio signals because DAB delivers audio signals that are near-CD quality. As a result, there is a demand for DAB and a consequent need for bandwidth. Because there is a desire by broadcasters to introduce DAB without significant increases in costs, broadcasters are seeking to introduce DAB without the need for new spectrum allocations.

One approach to this problem has been to transmit digital signals simultaneously with FM signals in the same band as the FM signal on the same radio station dial positions, i.e., the same channel, as the analog FM signals being transmitted. This is generally referred to as Hybrid In-Band, On-Channel (IBOC) FM combining. The resulting combined signal has a digital signal component and an FM signal component. As shown in FIG. 1, the digital components of the hybrid signal are spaced around the existing FM signal. The Hybrid IBOC DAB approach involves combining the digital signal and the FM signal after they have been separately amplified. Generally, the signals are combined after they have each been amplified because, in most cases, the FM transmission system is already in existence, and includes amplification of the FM signal.

An advantage of Hybrid IBOC DAB is that the combined FM and digital signals still fit within the FM FCC mask for the FM signal being combined. The FCC mask defines the boundaries for transmitting the existing FM signal. As shown in FIG. 1, the digital component of the signal is of relatively low power as compared to the FM component of the signal and fits within the FCC mask. Confining the combined signal within the FCC mask is described by Kroeger and Cammarata in "Robust Modem and Coding Techniques for FM Hybrid IBOC DAB," IEEE Broadcast Symposium 1997. Another advantage of Hybrid IBOC DAB, for signal transmission, is its efficiency over corresponding analog methods for signal transmission. In FM IBOC combining, error correction and data compression are performed in the generation of the digital broadcast signal and do not have to be separately performed. Thus, part of the efficiency of Hybrid IBOC DAB systems can be attributed to the reduction in signal transmission steps over the corresponding analog methods for signal transmission.

A disadvantage of the Hybrid IBOC DAB approach is the difficulty associated with keeping the signals isolated from each other, in such a way as to avoid intermodulation product generation in the transmitters. Intermodulation products are radio-frequency (RF) products that typically occur within the bandwidth of the existing FM signal (in-band), and also in adjacent channels (out-of-band). In-band intermodulation products generally cause distortion in the combined signal, and out-of-band intermodulation products generally affect the performance of other signals in adjacent channels.

The use of filters is one approach to reducing intermodulation products. However, utilizing filters in combining systems to provide isolation between the signals would be difficult because it would require a system having a large number of high quality factor (Q) sections. Thus, filters that pass signals within a very narrow bandwidth would be needed. Essentially, a "brickwall" filter would be needed, in which, for the most part, there is no transition bandwidth region between the signals which would be allowed to pass through the filter. Therefore, there would be no range of frequencies between the passband and the stopband. This approach would be difficult and costly to implement.

Another approach to reducing the generation of intermodulation products involves a combining system that utilizes a single −10 dB quadrature hybrid coupler, as shown in FIG. 2. The digital signal loses power, approximately 90%, to the reject load. This is typically not significant because the power required for the digital signal is low.

A disadvantage to this, however, is the loss of power suffered by the FM signal. The FM signal loses about 0.46 dB to the reject load when the FM signal passes through the −10 dB quadrature coupler. The insertion loss of the FM signal is significant although the amount of power lost by the FM signal is low compared to the amount of power lost by the digital signal. As a result of power lost by the FM signal, a larger transmitter may be required to compensate for the loss of power of the FM signal, so that the FM or combined signal is able to achieve the assigned Effective Radiated Power (ERP).

Although a system utilizing a single −10 dB quadrature hybrid coupler does provide for the isolation of the signals during transmission, it is inefficient because of the power lost in the reject loads.

Accordingly, it is desirable to provide an efficient system for transmitting digital signals with FM signals that maintains isolation between the two different signals during transmission and eliminates the loss that occurs when FM signals and digital signals are combined.

SUMMARY OF THE INVENTION

The foregoing desired result has been achieved to a great extent by the present invention in which, in one aspect, an apparatus for transmitting FM signals and digital signals is provided that includes, a +3 db hybrid quadrature coupler having a first input and a second input, a first transmission line coupled to the first input, a second transmission coupled to the second input, and a circularly polarized antenna coupled to the first transmission line and the second transmission line.

In another aspect of the present invention, a system for transmitting digital signals with FM signals is provided that includes, a coupler means for splitting a digital signal into a first digital signal part and a second digital signal part, and for splitting an FM signal into a first FM signal part and a second FM signal part, a first transmission line means and a second transmission line means coupled to the coupler means for transmitting the first digital signal part, the second digital signal part, the first FM signal part, and the second FM signal part, and an antenna means for receiving the first digital signal part, the second digital signal part, the first FM signal part, and the second FM signal part from the first transmission line means and the second transmission line means.

In another aspect of the present invention, a method for transmitting digital signals and FM signals is provided that includes, splitting a digital signal into a first digital part and a second digital part, such that there is a 90 degrees phase difference between each part using a hybrid quadrature coupler, splitting an FM signal into a first FM part and a second FM part, such that there is a 90 degrees phase difference between each part using a +3 db hybrid quadrature coupler, and transmitting a first pair of signals and a second pair of signals using a first transmission line and a second transmission line, wherein each pair of signals includes at least one of the digital signal first part and the digital signal second part, and including at least one of the FM signal first part and the FM signal second part, wherein there is a 90 degrees phase difference between the pair of signals.

According to the system for transmitting FM signals with digital signals of the present invention, it is possible to eliminate power lost by the FM signals and the digital signals, when they are combined. The use of the coupler and the cross-polarized two dipole members make it possible to maintain isolation of the signals. The hybrid coupler maintains isolation of the FM signals and the digital signals before they are fed into the transmitting antenna, while the cross-polarized dipole members maintain isolation of the FM signals and digital signals at the transmitting antenna. As a result, essentially all of both signals appear at the antenna.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
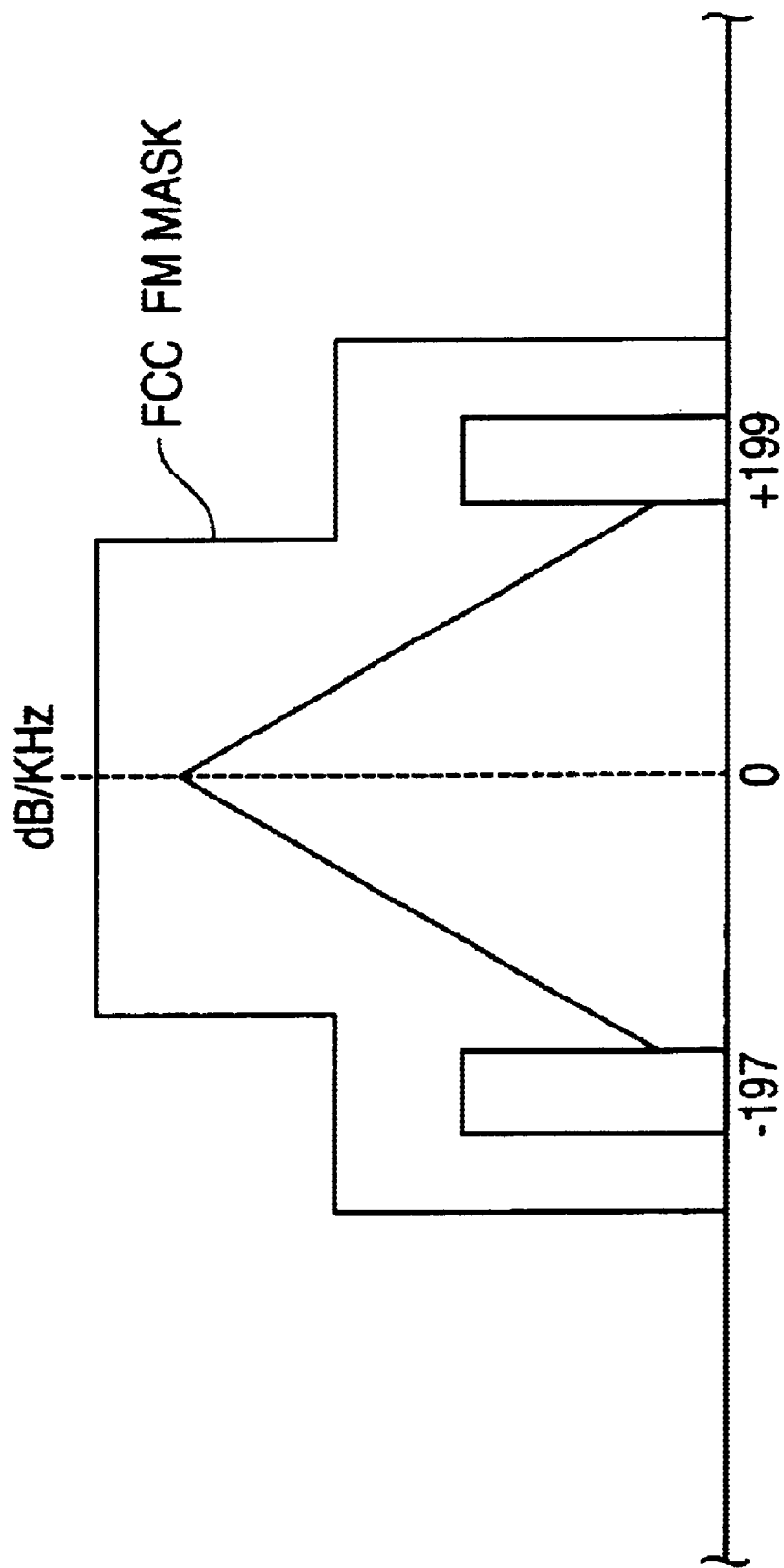
FIG. 1 illustrates a combined FM and digital signal.
Figure 2:
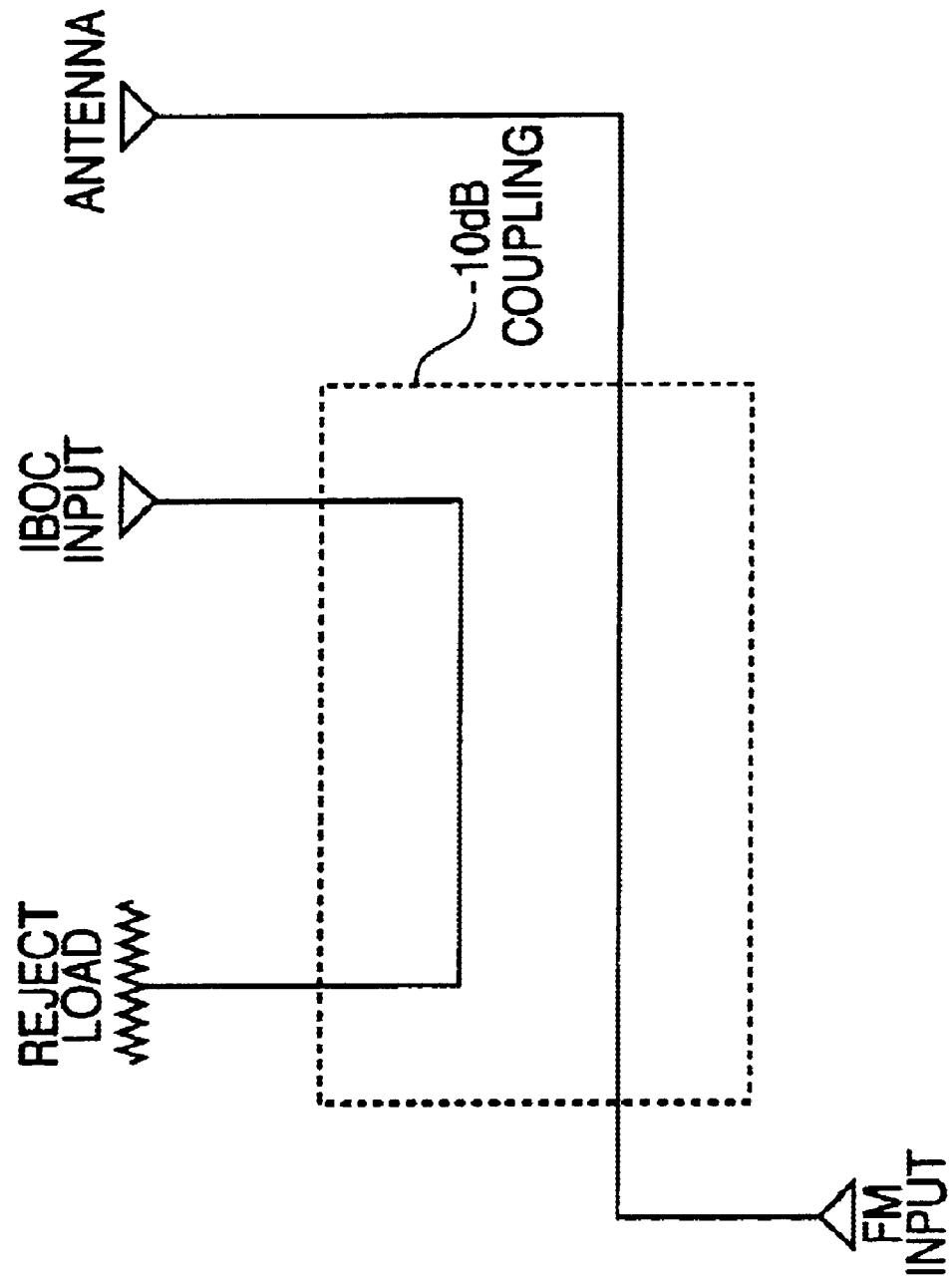
FIG. 2 illustrates a system for combining signals using a −10 dB quadrature hybrid coupler for IBOC combining.
Figure 3:
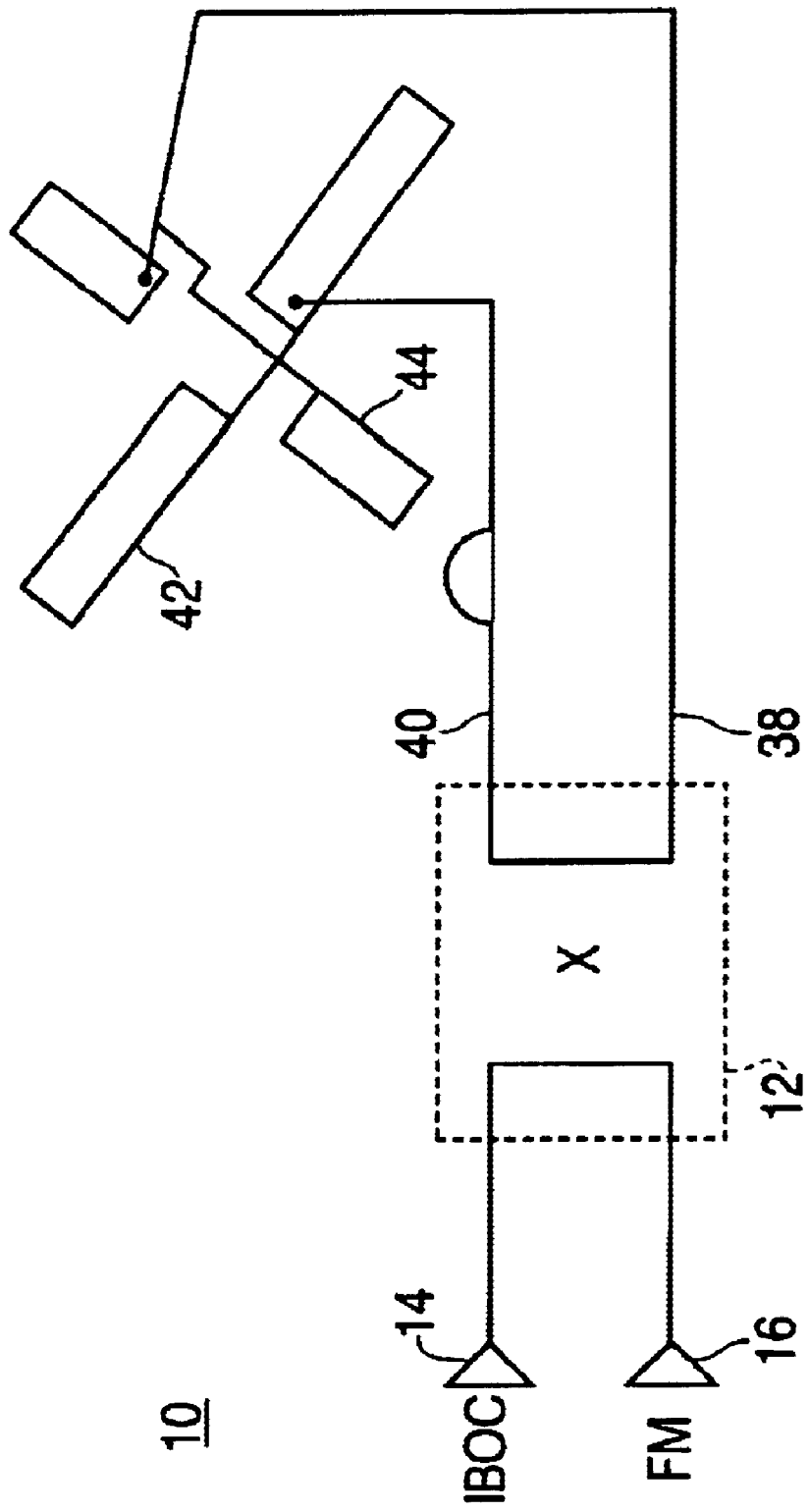
FIG. 3 illustrates elements of a preferred embodiment for IBOC DAB combining in accordance with the present invention.

Referring now to FIG. 3, there is shown a preferred embodiment of a system 10 for transmitting digital signals with FM signals, according to the present invention. As shown in FIG. 3, the system includes a coupler 12 that receives, at separate inputs, a digital signal 14 and an FM signal 16. In an exemplary embodiment, the coupler may be a +3 dB quadrature hybrid coupler or any other suitable device.

The coupler 32 acts as a splitter. It splits the FM signal into two parts of equal amplitude, but with a phase difference of 90 degrees. The coupler 32 outputs one part of the FM signal to feed line 38, for example the part at 0 degrees, and outputs the other part of the FM signal, the part at 90 degrees, to feedline 40. Similarly, coupler 32 splits the digital signal into two parts. However, it feeds the 0 degree part of the digital signal to feedline 40, which transmits the 90 degrees part of the FM signal, and transmits the 90 degree part to feedline 38, which transmits the 0 degrees part of the FM signal. Thus, by using a +3 db hybrid quadrature coupler 32, with a dual feed, the coupler 32 is able to accommodate both FM signals and digital signals at the same time because it transmits, at each output, a digital signal and an FM signal that are out of phase with each other by 90 degrees. Because of the isolation inherent in the design of the hybrid coupler 32, the signals do not interfere with each other. Accordingly, intermodulation products are not generated.

Further, the structure of the antenna, which consists of two dipole members 42 and 44, also maintains isolation between the FM signals and the digital signals. Thus, the structure of the antenna prevents intermodulation products from being generated at the transmitter. Because each feed line feeds a digital signal part and an FM signal part, which have a phase difference of 90 degrees, to each dipole arm, isolation between the FM signals and digital signals is maintained.

The two dipole arms form a circularly polarized antenna that is capable of transmitting signals that are right-hand circularly polarized or left-hand circularly polarized dependent upon the phase difference of the two signal parts delivered to it. As shown in FIG. 3, the circularly polarized antenna is formed by orienting two dipole antennas at right angles to each other and in the same plane. Typically, most FM stations utilize circularly polarized transmitting antennas that are phased for right-hand polarization. Thus, in most cases FM signals transmitted to the input of the +3 dB hybrid quadrature coupler will be phased for right-hand circular polarization. Thus, the digital signals will be phased for left-hand circular polarization. Because the FCC does not prescribe a certain polarization direction for either signal, it should be appreciated that the FM signals could be phased for left-hand polarization and the digital signals could be phased for right-hand polarization.

Isolation between the FM and digital/IBOC signals is maintained by both the hybrid coupler and the cross-polarization of the two dipole members. The hybrid coupler and the antenna, individually and in combination, contribute to preventing the signals from losing power. By using the system for simultaneously transmitting digital signals with FM signals, according to the present invention, essentially all of both the FM signals and the digital signals appear at the antenna inputs and are radiated by the antenna.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for transmitting digital signals with FM signals, comprising:
   a coupler means for splitting a digital signal into a first digital signal part and a second digital signal part, and for splitting an FM signal into a first FM signal part and a second FM signal part;
   a first transmission line means and a second transmission line means coupled to the coupler means for transmitting the first digital signal part, the second digital signal part, the first FM signal part, and the second FM signal part; and antenna means for receiving the first digital signal part, the second digital signal part, the first FM signal part, and the second FM signal part from the first transmission line means and the second transmission line means.

2. The system according to claim 1, further comprising:
   a transmission means for transmitting the FM signal to the coupler means.

3. The system according to claim 1, further comprising:
   a transmission means for transmitting the digital signal to the coupler means.

4. The system according to claim 1, wherein the first transmission line transmits a pair of signals including at least one of the digital signal first part and digital signal second part, and at least one of the FM signal first part and FM signal second part such that there is a phase difference of 90 degrees between the pair of signals for simultaneously transmitting a pair of signals, while maintaining isolation between the pair of signals.

5. The system of claim 1, wherein the first digital signal part and the second digital signal part are equal in amplitude.

6. The system of claim 1, wherein the first FM signal part and the second FM signal part are equal in amplitude.

7. A method for transmitting digital signals and FM signals, comprising:
   splitting a digital signal into a first digital part and a second digital part, such that there is a 90 degrees phase difference between each part using a hybrid quadrature coupler;
   splitting an FM signal into a first FM part and a second FM part, such that there is a 90 degrees phase difference between each part using a +3 dB hybrid quadrature coupler; and
   transmitting a first pair of signals and a second pair of signals using a first transmission line and a second transmission line, wherein each pair of signals includes at least one of the digital signal first part and the digital signal second part, and including at least one of the FM signal first part and the FM signal second part, wherein there is a 90 degrees phase difference between the pair of signals.

8. The method according to claim 7, further comprising:
   transmitting the first pair of signals using the first transmission line to a first dipole arm of a circularly polarized antenna.

9. The method according to claim 7, further comprising:
   transmitting the second pair of signals using the second transmission line to a second dipole arm of the circularly polarized antenna.

10. The method according to claim 7, wherein the first digital signal part and the second digital signal part are equal in amplitude.

11. The method according to claim 7, wherein the first FM signal part and the second FM signal part are equal in amplitude.

12. An apparatus for transmitting digital and analog FM signals, comprising:
    a +3 db hybrid quadature coupler having at least a first and second input, and at least a first and second output;
    a first input signal having at least one of a digital and analog FM signal;
    a second input signal having at least one of a digital and analog FM signal; and
    an antenna having at least a first and second radiator of orthogonal polarization,
    wherein the hybrid coupler splits each of the at least one of the digital and FM signals, of both the first and second inputs, into substantially equal parts, each part being shifted approximately 90 degrees from its split part, and wherein the antenna radiates the split parts having the shifted phases to form a radiated digital and radiated analog FM signal.

13. The apparatus according to claim 12, further comprising:
    at least two transmission lines coupling the antenna to the hybrid coupler.

14. The apparatus according to claim 12, further comprising:
    at least one or more transmitters providing at least the first and second input signals.

15. The apparatus according to claim 12, wherein the antenna's at least first and second radiators are of opposite radiation polarization polarity.

16. The apparatus according to claim 12, wherein the radiators of the antenna are crossed dipole arms.

17. The apparatus according to claim 12, wherein the polarization of the radiated signals are circular.

* * * * *

UNITED STATES PATENT AND TRADEMARK OFFICE
CERTIFICATE OF CORRECTION

PATENT NO. : 6,934,514 B2 Page 1 of 1
DATED : August 23, 2005
INVENTOR(S) : James T. Stenberg It is certified that error appears in the above-identified patent and that said Letters Patent is hereby corrected as shown below:

<u>Column 6,</u>
Line 27, please replace "quadature" with -- quadrature --.

Signed and Sealed this

Eighth Day of November, 2005

JON W. DUDAS
*Director of the United States Patent and Trademark Office*